(12) United States Patent
Ciesla et al.

(10) Patent No.: US 9,367,132 B2
(45) Date of Patent: Jun. 14, 2016

(54) USER INTERFACE SYSTEM

(75) Inventors: Craig Michael Ciesla, Mountain View, CA (US); Micah B. Yairi, Daly City, CA (US); Nathaniel Mark Saal, Palo Alto, CA (US)

(73) Assignee: Tactus Technology, Inc., Fremont, CA (US)

( * ) Notice: Subject to any disclaimer, the term of this patent is extended or adjusted under 35 U.S.C. 154(b) by 926 days.

(21) Appl. No.: 13/046,467

(22) Filed: Mar. 11, 2011

(65) Prior Publication Data

US 2012/0062483 A1     Mar. 15, 2012

Related U.S. Application Data

(60) Provisional application No. 61/313,054, filed on Mar. 11, 2010, provisional application No. 61/313,064, filed on Mar. 11, 2010.

(51) Int. Cl.
    *G06F 3/041*      (2006.01)
    *G06F 3/01*      (2006.01)
    *G06F 1/16*      (2006.01)

(52) U.S. Cl.
    CPC .............. *G06F 3/016* (2013.01); *G06F 1/166* (2013.01); *G06F 1/1626* (2013.01); *G06F 3/041* (2013.01); *G06F 2203/04809* (2013.01)

(58) Field of Classification Search
    CPC .......... G06F 3/016; G06F 3/02; G06F 3/044; G06F 1/1626; G06F 1/166; G06F 3/041; G06F 2203/04809
    USPC ......... 345/173, 174; 178/18.06; 715/701, 702
    See application file for complete search history.

(56) References Cited

U.S. PATENT DOCUMENTS

| | | | |
|---|---|---|---|
| 3,034,628 | A | 5/1962 | Wadey |
| 3,659,354 | A | 5/1972 | Sutherland |
| 3,759,108 | A | 9/1973 | Borom et al. |

(Continued)

FOREIGN PATENT DOCUMENTS

| CN | 1260525 A | 7/2000 |
|---|---|---|
| CN | 1530818 A | 9/2004 |

(Continued)

OTHER PUBLICATIONS

U.S. Appl. No. 13/046,467, filed Mar. 11, 2011, Ciesla et.al.

(Continued)

*Primary Examiner* — Amr Awad
*Assistant Examiner* — Aaron Midkiff
(74) *Attorney, Agent, or Firm* — Jeffrey Schox (57) ABSTRACT

A user interface system for a device that includes a first deformable layer that with a first sheet that defines a first surface, a first fluid vessel arranged underneath the first surface, and a first volume of fluid contained within the first fluid vessel that is manipulated to deform a first particular region of the first surface to receive a user input; a second deformable layer with a second sheet that defines a second surface, a second fluid vessel arranged underneath the second surface, and a second volume of fluid contained within the second fluid vessel that is manipulated to deform a second particular region of the second surface to change the shape of the device; and a displacement device a displacement device coupled to at least one of the first and second fluid vessels and configured to manipulate the volumes of fluid to deform particular regions of the surface.

10 Claims, 5 Drawing Sheets

(56) References Cited

U.S. PATENT DOCUMENTS

| | | |
|---|---|---|
| 3,780,236 A | 12/1973 | Gross |
| 3,818,487 A | 6/1974 | Brody et al. |
| 4,109,118 A | 8/1978 | Kley |
| 4,209,819 A | 6/1980 | Seignemartin |
| 4,290,343 A | 9/1981 | Gram |
| 4,307,268 A | 12/1981 | Harper |
| 4,467,321 A | 8/1984 | Volnak |
| 4,477,700 A | 10/1984 | Balash et al. |
| 4,517,421 A | 5/1985 | Margolin |
| 4,543,000 A | 9/1985 | Hasenbalg |
| 4,584,625 A | 4/1986 | Kellogg |
| 4,700,025 A | 10/1987 | Hatayama et al. |
| 4,743,895 A | 5/1988 | Alexander |
| 4,772,205 A | 9/1988 | Chlumsky et al. |
| 4,920,343 A | 4/1990 | Schwartz |
| 4,940,734 A | 7/1990 | Ley et al. |
| 5,194,852 A | 3/1993 | More et al. |
| 5,195,659 A | 3/1993 | Eiskant |
| 5,212,473 A | 5/1993 | Louis |
| 5,222,895 A | 6/1993 | Fricke |
| 5,286,199 A | 2/1994 | Kipke |
| 5,346,476 A | 9/1994 | Elson |
| 5,369,228 A | 11/1994 | Faust |
| 5,412,189 A | 5/1995 | Cragun |
| 5,459,461 A | 10/1995 | Crowley et al. |
| 5,488,204 A | 1/1996 | Mead et al. |
| 5,496,174 A | 3/1996 | Garner |
| 5,666,112 A | 9/1997 | Crowley et al. |
| 5,717,423 A | 2/1998 | Parker |
| 5,729,222 A | 3/1998 | Iggulden et al. |
| 5,742,241 A | 4/1998 | Crowley et al. |
| 5,754,023 A | 5/1998 | Roston et al. |
| 5,766,013 A | 6/1998 | Vuyk |
| 5,767,839 A | 6/1998 | Rosenberg |
| 5,835,080 A | 11/1998 | Beeteson et al. |
| 5,880,411 A | 3/1999 | Gillespie et al. |
| 5,889,236 A | 3/1999 | Gillespie et al. |
| 5,917,906 A | 6/1999 | Thornton |
| 5,943,043 A | 8/1999 | Furuhata et al. |
| 5,977,867 A | 11/1999 | Blouin |
| 5,982,304 A | 11/1999 | Selker et al. |
| 6,067,116 A | 5/2000 | Yamano et al. |
| 6,154,198 A | 11/2000 | Rosenberg |
| 6,154,201 A | 11/2000 | Levin et al. |
| 6,160,540 A | 12/2000 | Fishkin et al. |
| 6,169,540 B1 | 1/2001 | Rosenberg et al. |
| 6,187,398 B1 | 2/2001 | Eldridge |
| 6,188,391 B1 | 2/2001 | Seely et al. |
| 6,218,966 B1 | 4/2001 | Goodwin et al. |
| 6,243,074 B1 | 6/2001 | Fishkin et al. |
| 6,243,078 B1 | 6/2001 | Rosenberg |
| 6,268,857 B1 | 7/2001 | Fishkin et al. |
| 6,271,828 B1 | 8/2001 | Rosenberg et al. |
| 6,278,441 B1 | 8/2001 | Gouzman et al. |
| 6,300,937 B1 | 10/2001 | Rosenberg |
| 6,310,614 B1 | 10/2001 | Maeda et al. |
| 6,323,846 B1 | 11/2001 | Westerman et al. |
| 6,337,678 B1 | 1/2002 | Fish |
| 6,354,839 B1 | 3/2002 | Schmidt et al. |
| 6,356,259 B1 | 3/2002 | Maeda et al. |
| 6,359,572 B1 | 3/2002 | Vale |
| 6,366,272 B1 | 4/2002 | Rosenberg et al. |
| 6,369,803 B2 | 4/2002 | Brisebois et al. |
| 6,384,743 B1 | 5/2002 | Vanderheiden |
| 6,414,671 B1 | 7/2002 | Gillespie et al. |
| 6,429,846 B2 | 8/2002 | Rosenberg et al. |
| 6,437,771 B1 | 8/2002 | Rosenberg et al. |
| 6,462,294 B2 | 10/2002 | Davidson et al. |
| 6,469,692 B2 | 10/2002 | Rosenberg |
| 6,486,872 B2 | 11/2002 | Rosenberg et al. |
| 6,498,353 B2 | 12/2002 | Nagle et al. |
| 6,501,462 B1 | 12/2002 | Garner |
| 6,509,892 B1 | 1/2003 | Cooper et al. |
| 6,529,183 B1 | 3/2003 | Maclean et al. |
| 6,573,844 B1 | 6/2003 | Venolia et al. |
| 6,636,202 B2 | 10/2003 | Ishmael et al. |
| 6,639,581 B1 | 10/2003 | Moore et al. |
| 6,655,788 B1 | 12/2003 | Freeman |
| 6,657,614 B1 | 12/2003 | Ito et al. |
| 6,667,738 B2 | 12/2003 | Murphy |
| 6,681,031 B2 | 1/2004 | Cohen et al. |
| 6,683,627 B1 | 1/2004 | Ullmann et al. |
| 6,686,911 B1 | 2/2004 | Levin et al. |
| 6,697,086 B2 | 2/2004 | Rosenberg et al. |
| 6,700,556 B2 | 3/2004 | Richley et al. |
| 6,703,924 B2 | 3/2004 | Tecu et al. |
| 6,743,021 B2 | 6/2004 | Prince et al. |
| 6,788,295 B1 | 9/2004 | Inkster |
| 6,819,316 B2 | 11/2004 | Schulz et al. |
| 6,850,222 B1 | 2/2005 | Rosenberg |
| 6,861,961 B2 | 3/2005 | Sandbach et al. |
| 6,877,986 B2 | 4/2005 | Fournier et al. |
| 6,881,063 B2 | 4/2005 | Yang |
| 6,930,234 B2 | 8/2005 | Davis |
| 6,937,225 B1 | 8/2005 | Kehlstadt et al. |
| 6,975,305 B2 | 12/2005 | Yamashita |
| 6,979,164 B2 | 12/2005 | Kramer |
| 6,982,696 B1 | 1/2006 | Shahoian |
| 6,995,745 B2 | 2/2006 | Boon et al. |
| 7,027,032 B2 | 4/2006 | Rosenberg et al. |
| 7,056,051 B2 | 6/2006 | Fiffie |
| 7,061,467 B2 | 6/2006 | Rosenberg |
| 7,064,655 B2 | 6/2006 | Murray et al. |
| 7,079,111 B2 | 7/2006 | Ho |
| 7,081,888 B2 | 7/2006 | Cok et al. |
| 7,096,852 B2 | 8/2006 | Gregorio |
| 7,102,541 B2 | 9/2006 | Rosenberg |
| 7,104,152 B2 | 9/2006 | Levin et al. |
| 7,106,305 B2 | 9/2006 | Rosenberg |
| 7,106,313 B2 | 9/2006 | Schena et al. |
| 7,109,967 B2 | 9/2006 | Hioki et al. |
| 7,112,737 B2 | 9/2006 | Ramstein |
| 7,113,166 B1 | 9/2006 | Rosenberg et al. |
| 7,116,317 B2 | 10/2006 | Gregorio et al. |
| 7,124,425 B1 | 10/2006 | Anderson, Jr. et al. |
| 7,129,854 B2 | 10/2006 | Arneson et al. |
| 7,131,073 B2 | 10/2006 | Rosenberg et al. |
| 7,136,045 B2 | 11/2006 | Rosenberg et al. |
| 7,138,977 B2 | 11/2006 | Kinerk et al. |
| 7,138,985 B2 | 11/2006 | Nakajima |
| 7,143,785 B2 | 12/2006 | Maerkl et al. |
| 7,144,616 B1 | 12/2006 | Unger et al. |
| 7,148,875 B2 | 12/2006 | Rosenberg et al. |
| 7,151,432 B2 | 12/2006 | Tierling |
| 7,151,527 B2 | 12/2006 | Culver |
| 7,151,528 B2 | 12/2006 | Taylor et al. |
| 7,154,470 B2 | 12/2006 | Tierling |
| 7,158,112 B2 | 1/2007 | Rosenberg et al. |
| 7,159,008 B1 | 1/2007 | Wies et al. |
| 7,161,276 B2 | 1/2007 | Face |
| 7,161,580 B2 | 1/2007 | Bailey et al. |
| 7,168,042 B2 | 1/2007 | Braun et al. |
| 7,176,903 B2 | 2/2007 | Katsuki et al. |
| 7,182,691 B1 | 2/2007 | Schena |
| 7,191,191 B2 | 3/2007 | Peurach et al. |
| 7,193,607 B2 | 3/2007 | Moore et al. |
| 7,195,170 B2 | 3/2007 | Matsumoto et al. |
| 7,196,688 B2 | 3/2007 | Schena |
| 7,198,137 B2 | 4/2007 | Olien |
| 7,199,790 B2 | 4/2007 | Rosenberg et al. |
| 7,202,851 B2 | 4/2007 | Cunningham et al. |
| 7,205,981 B2 | 4/2007 | Cunningham |
| 7,208,671 B2 | 4/2007 | Chu |
| 7,209,028 B2 | 4/2007 | Boronkay et al. |
| 7,209,113 B2 | 4/2007 | Park |
| 7,209,117 B2 | 4/2007 | Rosenberg et al. |
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |

(56) References Cited

U.S. PATENT DOCUMENTS

| | | |
|---|---|---|
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,453,442 B1 | 11/2008 | Poynter |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 * | 2/2010 | King et al. .................... 345/173 |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 * | 6/2012 | Tanabe et al. .................. 345/173 |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,378,797 B2 | 2/2013 | Pance et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 8,856,679 B2 | 10/2014 | Sirpal et al. |
| 9,116,617 B2 | 8/2015 | Ciesla et al. |
| 2001/0008396 A1 | 7/2001 | Komata |
| 2001/0043189 A1 | 11/2001 | Brisebois et al. |
| 2002/0063694 A1 | 5/2002 | Keely et al. |

(56) References Cited

U.S. PATENT DOCUMENTS

| | | |
|---|---|---|
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1* | 1/2004 | Mueller et al. ............ 379/433.01 |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0026535 A1 | 2/2006 | Hotelling et al. |
| 2006/0053387 A1 | 3/2006 | Ording |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0238517 A1 | 10/2006 | King et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0254411 A1 | 11/2007 | Uhland et al. |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1* | 7/2008 | Jobs et al. ..................... 345/173 |
| 2008/0202251 A1 | 8/2008 | Serban et al. |
| 2008/0238448 A1 | 10/2008 | Moore et al. |
| 2008/0248836 A1* | 10/2008 | Caine ........................... 455/566 |
| 2008/0251368 A1 | 10/2008 | Holmberg et al. |
| 2008/0252607 A1 | 10/2008 | De et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1* | 1/2009 | Ullrich et al. ................. 345/173 |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1* | 3/2009 | Matsuoka ............ H05K 5/0017 |
| | | 361/679.55 |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1* | 5/2009 | Caine et al. ..................... 341/34 |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |
| 2010/0171719 A1 | 7/2010 | Craig et al. |
| 2010/0171720 A1 | 7/2010 | Craig et al. |
| 2010/0171729 A1 | 7/2010 | Chun |
| 2010/0177050 A1 | 7/2010 | Heubel et al. |
| 2010/0182245 A1 | 7/2010 | Edwards et al. |
| 2010/0225456 A1 | 9/2010 | Eldering |
| 2010/0232107 A1 | 9/2010 | Dunn |
| 2010/0237043 A1 | 9/2010 | Garlough |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |

(56) References Cited

U.S. PATENT DOCUMENTS

| | | |
|---|---|---|
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1* | 8/2011 | Morishige et al. ............ 345/173 |
| 2011/0194230 A1 | 8/2011 | Hart et al. |
| 2011/0241442 A1 | 10/2011 | Mittleman et al. |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2013/0275888 A1 | 10/2013 | Williamson et al. |
| 2014/0043291 A1 | 2/2014 | Ciesla et al. |
| 2014/0160044 A1 | 6/2014 | Yairi et al. |
| 2014/0160063 A1 | 6/2014 | Yairi et al. |
| 2014/0160064 A1 | 6/2014 | Yairi et al. |
| 2014/0176489 A1 | 6/2014 | Park |
| 2015/0009150 A1 | 1/2015 | Cho et al. |
| 2015/0091834 A1 | 4/2015 | Johnson |
| 2015/0205419 A1 | 7/2015 | Calub et al. |
| 2015/0293591 A1 | 10/2015 | Yairi et al. |

FOREIGN PATENT DOCUMENTS

| | | |
|---|---|---|
| CN | 1882460 A | 12/2006 |
| EP | 2000884 A1 | 12/2008 |
| JP | 10255106 | 9/1998 |
| JP | H10255106 | 9/1998 |
| JP | 2006268068 A | 10/2006 |
| JP | 2006285785 A | 10/2006 |
| JP | 2009064357 A | 3/2009 |
| KR | 20000010511 | 2/2000 |
| KR | 100677624 B | 1/2007 |
| WO | 2004028955 A | 4/2004 |
| WO | 2006082020 A1 | 8/2006 |
| WO | 2008037275 A | 4/2008 |
| WO | 2008037275 A1 | 4/2008 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

U.S. Appl. No. 13/278,125, filed Oct. 20, 2011, Ciesla et.al.
U.S. Appl. No. 13/278,138, filed Oct. 20, 2011, Ciesla et.al.
U.S. Appl. No. 12/975,329, filed Dec. 2010, Ciesla et.al.
U.S. Appl. No. 12/975,337, filed Dec. 2010, Ciesla et.al.
"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.
Jeong et al., "Tunable Microdoublet Lens Array," Optical Society of America, Optics Express; vol. 12, No. 11. May 31, 2004, 7 Pages.
Preumont, A. Vibration Control of Active Structures: An Introduction, Jul. 2011.
Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.
Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 pp. 1125-1154, [retrieved on Nov. 18, 2004]. Retrieved from the internet. URL: <https://www.google.com/webhp?sourceid=chrome-instant&ion=1&espv=2&ie=UTF-8#q=materials-05-01125.pdf>.

\* cited by examiner

USER INTERFACE SYSTEM

CROSS-REFERENCE TO RELATED APPLICATIONS

This application claims the benefit of U.S. Provisional Application No. 61/313,054, filed on 11 Mar. 2010, and U.S. Provisional Application No. 61/313,064, filed 11 Mar. 2010, which are incorporated in their entirety by this reference.

This application is related to U.S. application Ser. No. 11/969,848 filed on 4 Jan. 2008 and entitled "System and Method for Raised Touch Screens", U.S. application Ser. No. 12/319,334 filed on 5 Jan. 2009 and entitled "User Interface System", U.S. application Ser. No. 12/652,708 entitled "User Interface System" filed on 5 Jan. 2010, and U.S. application Ser. No. 12/652,704 entitled "User Interface System" filed on 5 Jan. 2010, which are all incorporated in their entirety by this reference.

DESCRIPTION OF THE PREFERRED EMBODIMENTS

The following description of the preferred embodiments of the invention is not intended to limit the invention to these preferred embodiments, but rather to enable any person skilled in the art to make and use this invention.

The System of the Preferred Embodiments

Figure 1:
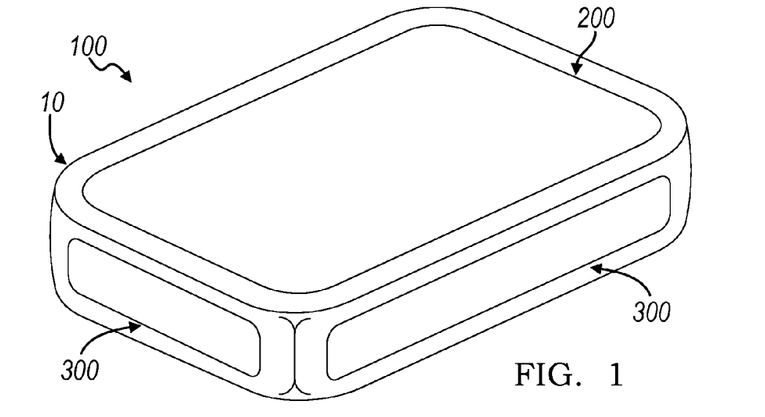
FIG. 1 is a schematic representation of the system of the preferred embodiments as applied to a device.
Figure 2:
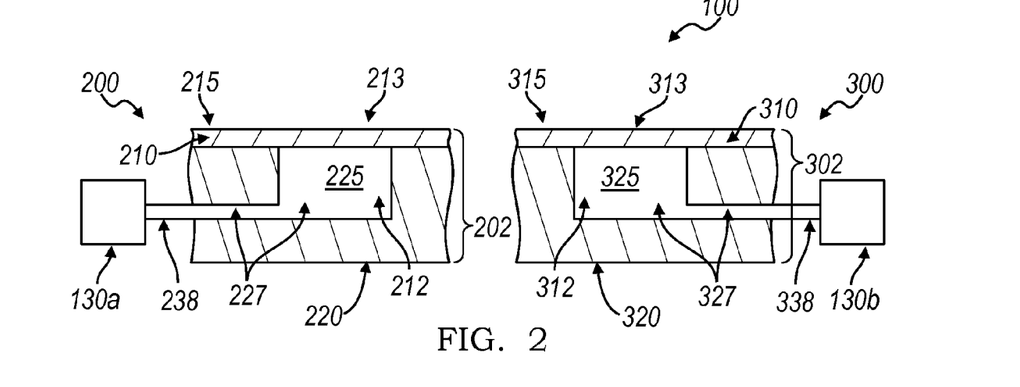
FIGS. 2, 3a, 3b, and 4 are schematic representations of variations of the first and second deformable layers of the user interface system.

As shown in FIGS. 1 and 2, the user interface system 100 of the preferred embodiments comprises a first deformable layer 200 that includes a first sheet 202 that defines a first surface 215, a first fluid vessel 227 arranged underneath the first surface, and a first volume of fluid 212 contained within the first fluid vessel 227 that is manipulated to deform a first particular region 213 of the first surface 215 to receive a user input; a second deformable layer 300 that includes a second sheet 302 that defines a second surface 315, and a second volume of fluid 312 contained within the second fluid vessel 327 that is manipulated to deform a second particular region 313 of the second surface 315 to change the shape of the device; and a displacement device 130 coupled to at least one of the first and second fluid vessels 227 and 327 and configured to manipulate at least one of the first and second volumes of fluid 212 and 312, thereby deforming at least one of the first and second particular regions 213 and 313.

Figure 5:
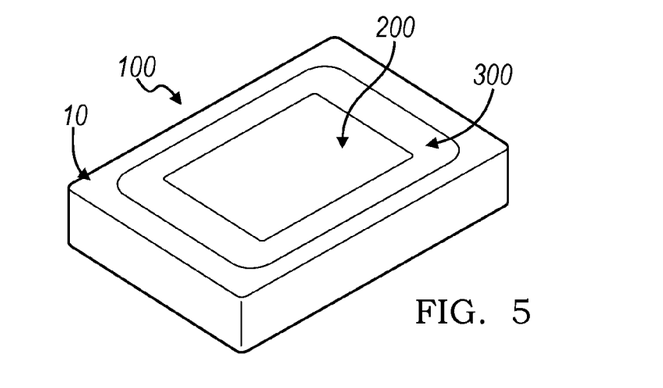
FIG. 5 is a schematic representation of a variation of the arrangement of the first and second deformable layers of the user interface system.
Figure 6:
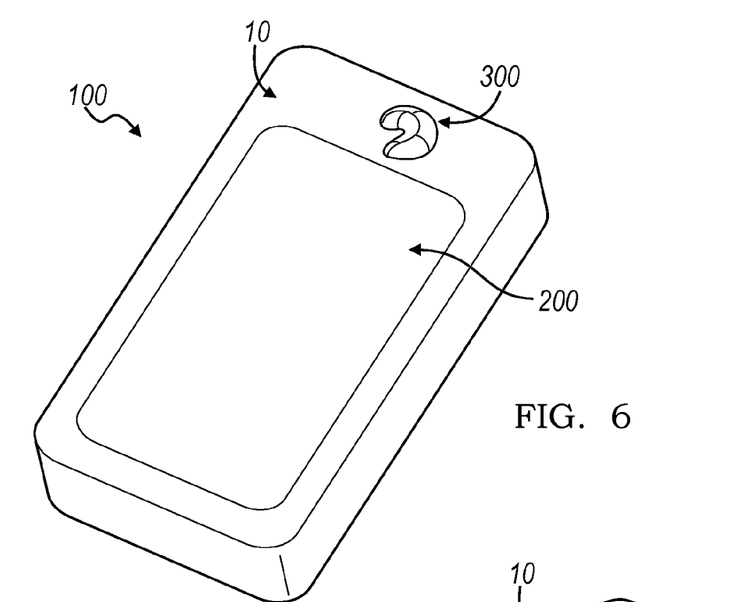
FIGS. 6, 7, 8a, 8b, 9a, 9b, and 10 are schematic representations of variations of the deformation of the second deformable layer when applied to a device.
Figure 7:
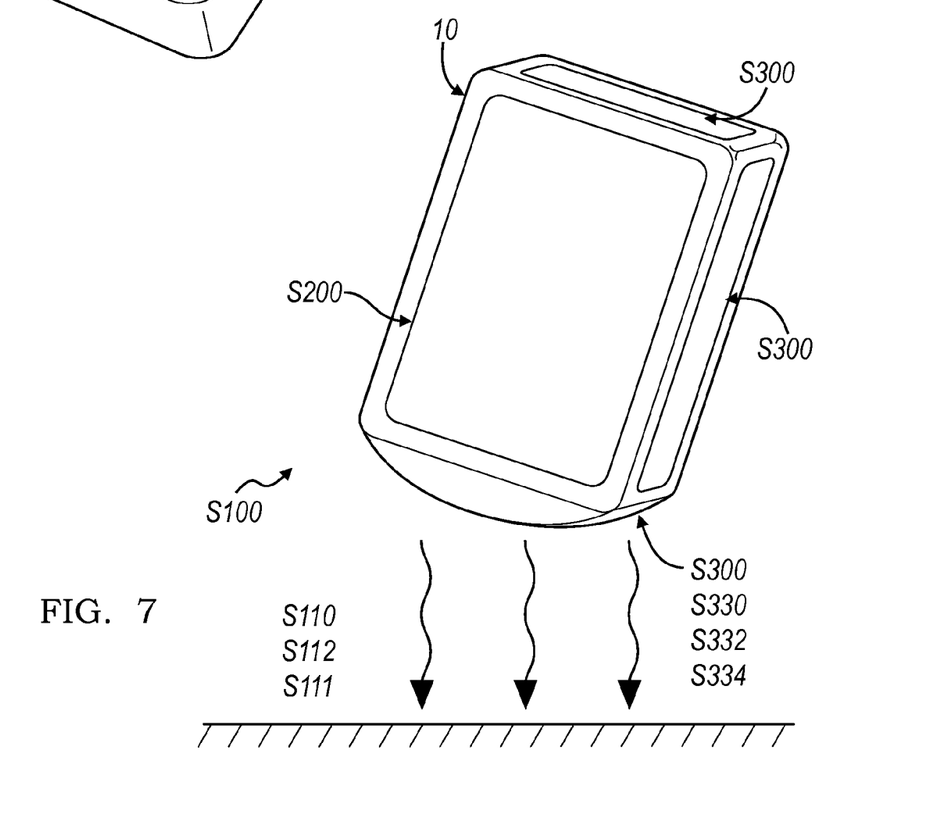
Figure 9A:
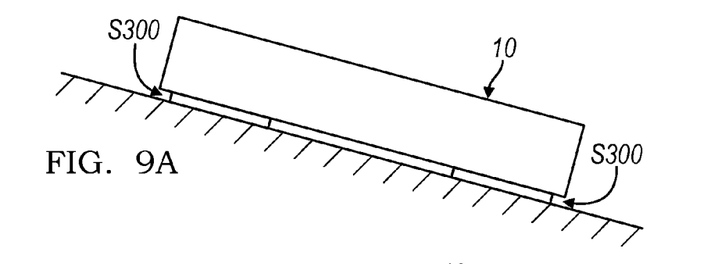
Figure 9B:
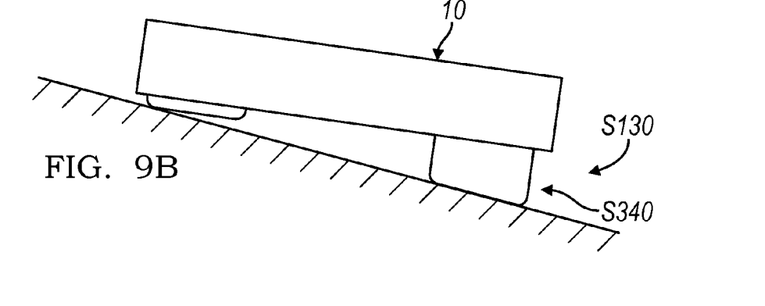
Figure 10A:
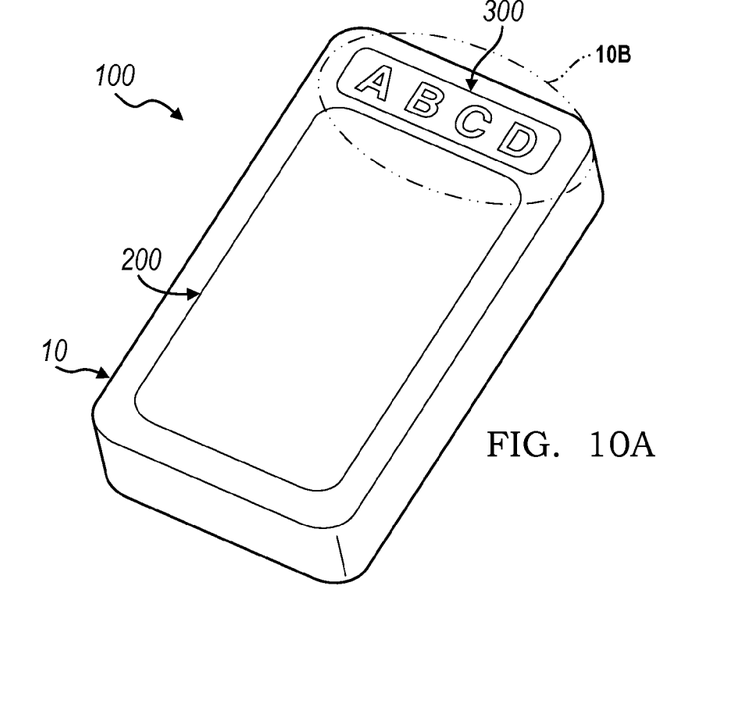
Figure 10B:
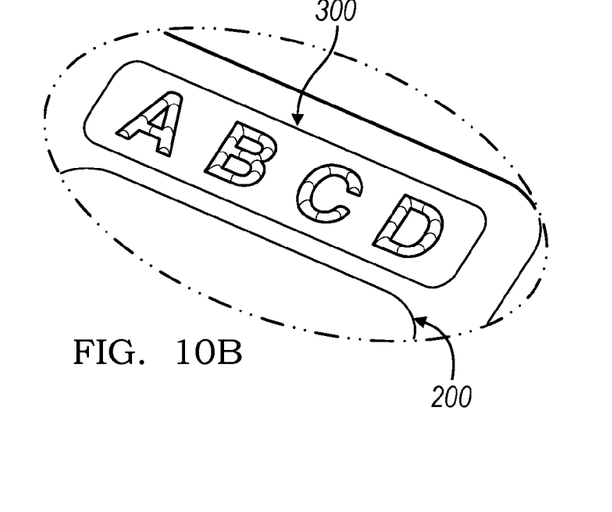

The user interface system 100 is preferably applied to a device 10 (as shown in FIGS. 1 and 5-10). The first deformable layer 200 preferably functions as the touch interface system that is applied to the device 10 where tactile guidance is to be provided to the user, such as a touch sensitive display, any other type of sensor or display, or any other suitable device as described in U.S. application Ser. No. 11/969,848 filed on 4 Jan. 2008 and entitled "System and Method for Raised Touch Screens", and U.S. application Ser. No. 12/319, 334 filed on 5 Jan. 2009 and entitled "User Interface System," and the second deformable layer 300 preferably functions as an accessory interface system that provides any other suitable tactile experience related to the device 10. For example, the second deformable layer 300 may function to provide information to the user such as a tactile communication to the user to indicate the occurrence of an event or a tactile locator for a feature of the device (such as the speaker or the volume button as shown in FIG. 6); to provide protection for the device (such as a bumper to protect the device or "feet" that support the device when placed on a surface, as shown in FIGS. 7 and 8); to change the orientation of the device (such as when the device is placed on an unlevel surface, as shown in FIG. 9); to provide a visual aesthetic (such as to provide a decoration on the device 10 or to provide an aesthetic enhancement to the logo of the company manufacturing and/or designing the device 10, as shown in FIG. 10); or any other suitable tactile experience related to the device 10. The device 10 is preferably an electronic device such as a cellular phone, a media player, a laptop, a computer, a camera, television, automated teller machine, or any other suitable device. Alternatively, the device 10 may be an interface component of a larger device, for example, the steering wheel of a vehicle or the center control console of a vehicle. However, the device 10 may be any other suitable device.

The first and second deformable layers may be arranged in any suitable arrangement along the surfaces of the device 10. For example, the first deformable layer 200 may be arranged on the main touch interface surface of the device 10 while the second deformable layer 300 is arranged on a side face of the device 10 and/or on a face opposite the main touch interface surface where a volume button, camera button, an on/off button, a ringer on/off switch, or any other suitable feature may be located, as shown in FIGS. 1 and 7. Alternatively, the second deformable layer may be located on the same face as the first deformable layer, for example, the second deformable layer may be located along the perimeter of the first deformable layer as shown in FIGS. 5 and 8 or exterior to one edge of the first deformable layer, as shown in FIGS. 6 and 10, or in any other suitable arrangement. Alternatively, the first and second deformable layers 200 and 300 may both be of the touch interface system as described in U.S. application Ser. No. 11/969,848 filed on 4 Jan. 2008 and entitled "System and Method for Raised Touch Screens", and U.S. application Ser. No. 12/319,334 filed on 5 Jan. 2009 and entitled "User Interface System," The first and second deformable layers 200 and 300 may be applied to the same display and/or touch sensitive display, but may also be applied to devices 10 that include two displays and/or touch sensitive displays (for example, dual screen laptops, or handheld game consoles). However, the first and second deformable layers 200 and 300 may be any other suitable type of system.

The first and second deformable layers are preferably structurally similar. In particular, the first and second sheets 202 and 302 are preferably substantially identical. Each of the first and second sheets 202 and 302 may include a first and second layer portion 210 and 310, respectively, that are substantially similar, and a first and second substrate portion 220 and 320, respectively, that are substantially similar. The first and second layer portions 210 and 310 preferably define the first and second surfaces 215 and 315, respectively, and are preferably of the type as described in U.S. application Ser. No. 12/319,334 filed on 5 Jan. 2009 and entitled "User Interface System." The first and second substrate portions 220 and 320 preferably support the first and second layers 210 and 310, respectively, and at least partially define the first and second fluid vessels 227 and 327, respectively, that are substantially similar and of the type as described in U.S. application Ser. No. 12/319,334 filed on 5 Jan. 2009 and entitled "User Interface System." The first and second fluid vessels 227 and 327 may include a first and second cavity 225 and 325, respectively, and/or a first and second channel 238 and 338, respectively, but may alternatively include any other suitable combination of cavities and channels. Alternatively, the first and second sheets 202 and 302 may alternatively be substantially different. For example, the first sheet 202 may include a first layer portion 210 and a first substrate portion 220 of the type described in U.S. application Ser. No. 12/319,334 filed on 5 Jan. 2009 and entitled "User Interface System," while the second sheet 302 may be a substantially continuous sheet that defines the second surface 315 and the second fluid vessel 327. However, any other suitable arrangement of the first and second sheets 202 and 302 may be used.

The displacement device 130 functions to manipulate at least one of the first and second volumes of fluid 202 and 302, thereby deforming at least one of the first and second particular regions 213 and 313 and is preferably of a type as described in U.S. application Ser. No. 12/319,334 filed on 5 Jan. 2009 and entitled "User Interface System," but may alternatively be any other suitable type of displacement device. The displacement device 130 is preferably coupled to at least one of the first fluid vessel 227 and 327 and functions to manipulate the volume of fluid within the coupled fluid vessel to expand at least a portion of the fluid vessel to deform a corresponding particular region. The displacement device 130 preferably subsequently manipulates the volume of fluid within the coupled fluid vessel to un-deform the corresponding particular region.

In a first variation of user interface system 100, as shown in FIG. 2, the first deformable layer is separate from the second deformable layer, where the displacement device includes a first displacement device 130a that is coupled to the first fluid vessel 227 of the first deformable layer 200 and functions to manipulate the first volume of fluid 212 to deform a first particular region 213 of the first surface 215 and a second displacement device 130b that is coupled to the second fluid vessel 327 of the second deformable layer 300 and functions to manipulate the second volume of fluid 312 to deform a second particular region 313 of the second surface 315. A processing unit preferably controls both the displacement devices 130a and 130b of the first variation to manipulate the first and second volumes of fluid 212 and 312 independently of each other.

Figure 3A:
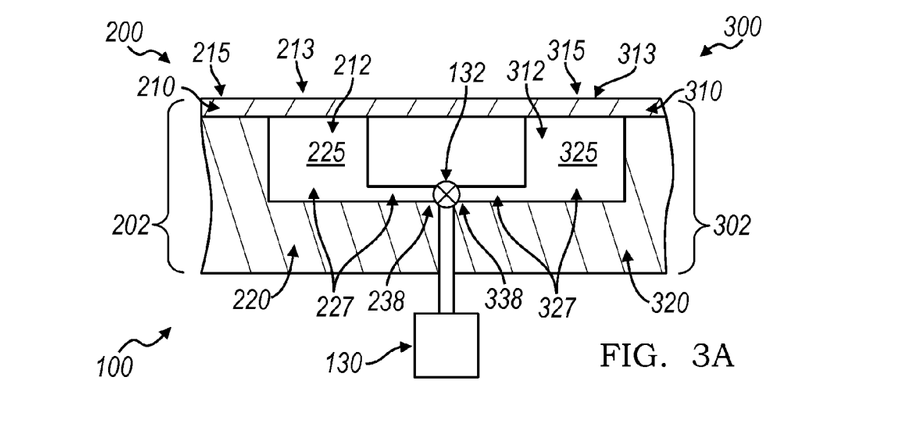
Figure 3B:
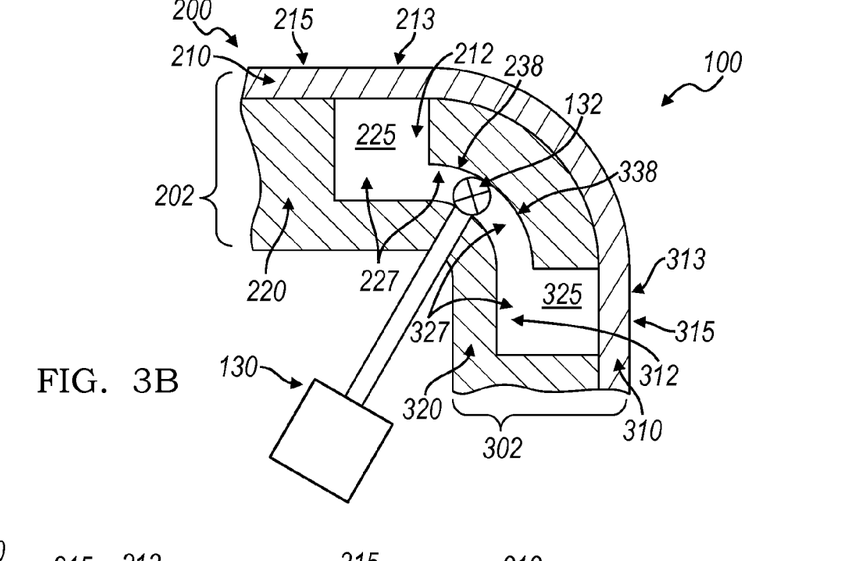

In a second variation of the user interface system 100, as shown in FIGS. 3a and 3b, the first and second deformable layers 200 and 300 are connected and the first and second deformable layers 200 and 300 share a displacement device 130. In particular, the first and second fluid vessels 227 and 327 are both coupled to the displacement device 130. In the example as shown in FIGS. 3a and 3b, the first and second layer portions 210 and 310 and the first and second substrate portions 220 and 320 are substantially continuous. In this second variation, the surface 115 may be planar (shown in FIG. 3a), but may alternatively be non-planar (shown in FIG. 3b). This may be useful in usage scenarios where the device has more than one face where tactile guidance is desired. To provide tactile guidance on more than one face of a device 10, as shown in FIG. 1, in the first variation of the user interface system 100, the first surface 215 may be arranged on a first face of the device and the second surface 315 may be arranged on a second face of the device. In the second variation of the user interface system 100, as shown in FIG. 3b, the connected first and second deformable layers 200 and 300 may be wrapped around the device to reach more than one face. The second variation may allow fewer parts and more cost effective manufacturing. A processing unit preferably controls the displacement device 130 to manipulate the first and second volumes of fluid 212 and 312 independently of each other. The user interface system 100 of this second variation may include a valve 132 or any other suitable fluid directing component may also be used to direct fluid displaced by the displacement device 130 to the desired fluid vessel or vessels.

Figure 4:
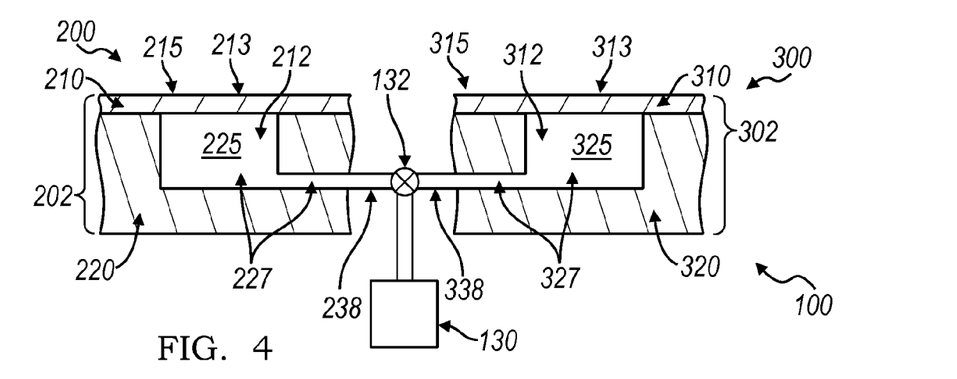

In a third variation of the user interface system 100, as shown in FIG. 4, the first and second deformable layers 200 and 300 are physically separated, but still share a displacement device 130. This allows for one displacement device to actuate the expansion and retraction of both the first and second fluid vessels 227 and 327 of the first and second deformable layers, respectively while allowing additional flexibility in characteristics and arrangement of the first and second deformable layers. A processing unit preferably controls the displacement device 130 to manipulate the first and second volumes of fluid 212 and 312 independently of each other. The user interface system 100 of this second variation may include a valve 132 or any other suitable fluid directing component may also be used to direct fluid displaced by the displacement device 130 to the desired fluid vessel or vessels. In this third variation, the first and second deformable layers 200 and 300 may be combined to function similarly to the second variation where the first and second deformable layers 200 and 300 are connected. However, any other suitable arrangement of the first and second deformable layers 200 and 300 may be used.

While the user interface system 100 of the preferred embodiments is preferably one of the above mentioned variations, the user interface system 100 may be of any suitable combination of the above variations and/or any other suitable variation.

In the first and third variations, the first deformable layer 200 and the second deformable layer 300 are preferably identical. For example, the first layer 210, first substrate 220, first fluid vessel 227, and the displacement device 130a of the first deformable layer are each substantially similar or identical to the corresponding second layer 310, second substrate 320, second fluid vessel 327, and the displacement device 130b of the second deformable layer. The corresponding components in the first and second deformable layers may be substantially similar or include slightly different properties that allow each portion to better provide the desired performance of each portion. For example, the first layer 210 of the first deformable layer functions to provide substantially rectangular deformed first particular region 213 of the first surface 215 and/or buttons that provide a "clicking" sensation to the user when the user inwardly deforms the deformed first particular region 213, while the second deformable layer functions to provide a relatively smaller, substantially round deformed second particular region 313 of the second surface 315 that may be used to indicate the location of a volume button and does not need to be inwardly deformed by the user. A "clicking" sensation may be further defined as a binary button that transitions between an unactuated button and an actuated button, for example, as seen in a key on a typical keyboard. Alternatively, the deformed first particular region 213 of the first surface 213 may provide a substantially linear response to a user when the user inwardly deforms the deformed first particular region 213 or any other suitable type of sensation as described in U.S. application Ser. No. 12/652,708, which is hereby incorporated in its entirety by this reference. In this example, the second fluid vessel 327 may be relatively smaller than the first fluid vessel 227 and the layer 310 may have a simpler geometry than the layer 210, which may have geometrical features built in to allow for inward deformation of the deformed second particular region 313 and/or provide the "clicking" sensation to the user. The layer 210 and the layer 310 may also be of materials with different stiffness and/or thickness. In a second example, the first surface 215 may also include a different texture than the second surface 315, which allows the user to distinguish between the first and second deformable layers by the tactile sensation provided by the surface. However, the corresponding components between the first and second deformable layers may be of any other suitable variation.

Similarly, the first and second deformable layers of the second variation may also include variations. For example, the second surface 315 of second deformable layer may include a coating that changes the texture of the second surface 315 relative to the first surface 215 the first deformable layer. The sizes of the first fluid vessel 227 and second fluid vessel 327 may also be different. Additionally, the geometry of the first layer portion 210 of the first deformable layer may include geometrical features or any other suitable features that are different from the geometry of the second layer portion 310 of the second deformable layer to deliver different tactile experiences between the first and second deformable layers, including, for example, the devices and techniques described in U.S. application Ser. No. 12/652,708 entitled "User Interface System" filed on 5 Jan. 2010, which is hereby incorporated in its entirety by this reference. Alternatively, the first and second deformable layers 200 and 300 may include different visual properties, for example, one may be substantially transparent while the other substantially opaque. However, any other suitable variation within portions of the first and second layer portions 210 and 310 and the first and second substrate portions 220 and 320 and the first fluid vessel 227 and second fluid vessel 327 may be used.

As mentioned above, in a variation of the user interface system 100, the first deformable layer preferably functions as the touch interface system that is applied to a touch sensitive display or any other type of touch sensor or display that may be included in the device 10 and the second deformable layer preferably functions as an accessory interface system that provides any other suitable tactile experience related to the device 10. In a first variation, the second deformable layer 300 may function to provide information to the user such as a tactile communication to the user, for a example, a tactile communication to indicate the occurrence of an event or a tactile locator for a feature of the device (such as the speaker or the volume button as shown in FIG. 6). In a second variation, the second deformable layer 300 may function to provide protection for the device, for example, a bumper to protect the device or "feet" or risers that support the device when placed on a surface, as shown in FIGS. 7 and 8. In a third variation, the second deformable layer 300 may function to change the orientation of the device, for example, when the device is placed on an unlevel surface, as shown in FIG. 9. This may be particular useful in the variation where the device is a projector and the second deformable layer 300 may change the orientation of the device to affect the resulting projected image. In a fourth variation, the second deformable layer 300 may function to provide a visual aesthetic, for example, to provide a decoration on the device 10 or to provide an aesthetic enhancement to the logo of the company manufacturing and/or designing the device 10, as shown in FIG. 10. In a second example of a visual aesthetic, the fluid 312 of the second deformable layer 300 may be of a different color such that the deformed particular region 313 of the second deformable layer 300 may include a different color. However, any other suitable tactile experience related to the device 10 may be provided by the second deformable layer 300.

In the first variation, the second deformable layer 300 functions to provide information to the user. In a first example, the second deformable layer 300 may provide a tactile communication to the user to indicate the occurrence of an event. The displacement device 130 may function to expand and retract the second fluid vessel 327 in a pulsating fashion to provide a tactile pulse to indicate the occurrence of an event. The pulse may vary the stiffness, height, or any other suitable tactilely distinguishable property of the deformed particular region 313. In this variation, the second deformable layer 300 may be located along a side face of the device 10 (as shown in FIGS. 1 and 7). The fluid vessel 327 may include a plurality of cavities 325 that the displacement device 130 expands concurrently or in a certain sequence, using, for example, the devices and techniques described in U.S. application Ser. No. 12/652,704 entitled "User Interface System" filed on 5 Jan. 2010. By expanding the plurality of cavities 325 in a certain sequence, a certain type of pulsating pattern may be exhibited on the second deformable layer 300, for example, if adjacent cavities 325 are expanded one after the other, a ripple effect or a wave may be exhibited on the surface 115 of the second deformable layer 300. Alternatively, if cavities 325 located substantially apart from each other are expanded one after another, a "boiling water" effect may be exhibited on the surface 115 of the second deformable layer 300. However, any other suitable sequence of expansion of the cavities 325 to allow the surface 115 of the second deformable layer 300 to exhibit any suitable effect may be used. The sequence of expansion may be selected by the user or may alternatively be pre-programmed by the manufacturer or an application of the device. In the substantially rectangular prism type geometry of the device 10, as shown in the FIGURES, the second deformable layer 300 may be also located along all four side faces of the rectangular prism geometry to provide tactile communication along all sides faces of the device 10. Alternatively, the second deformable layer 300 may be placed on the front main face and/or the back main face opposite the front main face of the device 10. The displacement device 130 may alternatively function to only expand or only retract the second fluid vessel 327 to communicate the occurrence of an event. For example, a second fluid vessel 327 may include a single cavity 325 that may be expanded to indicate to the user the occurrence of an event, or, a pattern of cavities 325 may be expanded. The pattern of cavities 325 may indicate the type of message, for example, a triangle may indicate a text message while a square may indicate an email. The pattern of cavities 325 may also spell out a word to indicate the event or the contents of an event such as a text message. In another example, the second deformable layer 300 may function to inform the user regarding the state of the device. For example, the device may "go to sleep" after a period of no use. When the user picks the device up again, a processor may detect the movement of the device (for example, through an accelerometer), and the second deformable layer 300 may deform a particular region to indicate that the device is "awake" and ready to receive a user command. However, any other suitable arrangement or tactile communication may be provided by the second deformable layer 300, for example, a particular region may be deformed and maintained in the deformed state substantially statically to indicate to the user the occurrence of an event.

In a second example of the first variation, the second deformable layer 300 functions to provide a tactile locator for a feature of the device, as shown in FIG. 6. The second deformable layer 300 preferably provides the tactile locator when the device 10 is performing a related task. In the variation of the device 10 that is a phone, if the user indicates that he or she desires to make a phone call, the displacement device 130 may expand a second fluid vessel 327 of the second deformable layer 300 that is located in relative close proximity or adjacent to the ear speaker of the device 10, indicating to the user where to locate the device relative to his/her ear. In this variation, the deformed particular region 313 may be of a shape that is customized to the shape of the ear of the user to increase the potential comfort of placing the device 10 by the user's ear. However, any other suitable shape of the deformed particular region 313 may be used. In the variation of the device that includes a media player, when the user initiates playback of music and/or video, the displacement device 130 may deform a cavity 325 of the second fluid vessel 327 of the second deformable layer 300 that is located in relative close proximity or adjacent to the volume button and/or the play/pause button. This may also be applicable to when the user is making a phone call on the phone variation of the device 10. Because the handset will be by the user's ear and not easily visible, a tactile locator for the volume button may be useful to allow the user to easily adjust the volume of the call. However, any other arrangement or function of the second deformable layer 300 to provide tactile locating features may be used.

In a second variation, the second deformable layer 300 may function to provide protection for the device, for example, from falling or from scratching. In a first example, the second deformable layer 300 may function to deform the second particular region 313 to form a bumper, as shown in FIG. 7, that functions to protect a face of the device from, for example, a fall. In this example, a processor may function to detect the acceleration of the device (for example, through accelerometer), and based on the detected acceleration, the processor may actuate the deformation of the particular region 313 to form a bumper. In this example, the processor may also detect the face of the device 10 that is closest to impact upon the fall and function to actuate the deformation of the particular region 313 that is substantially proximal to the predicted face of impact. This allows the fluid manipulation performed by the displacement device 130 to be allocated to a particular face with a higher chance of damage. In variations of the displacement device 130 where the volume of fluid displaced per unit time is not high enough to form bumpers on all the possible faces of the device 10 in time to protect the device 10 upon impact, allocation of the fluid manipulation to create a bumper on the face of impact may increase the effectiveness of a bumper that is located at the face of impact. However, any other suitable arrangement of the bumper may be used.

Figure 8A:
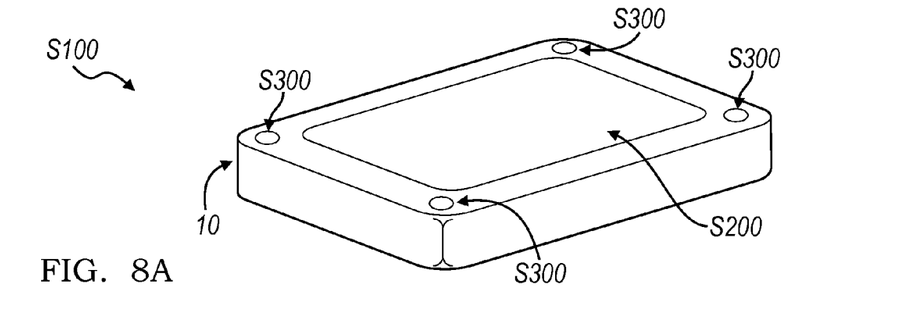
Figure 8B:
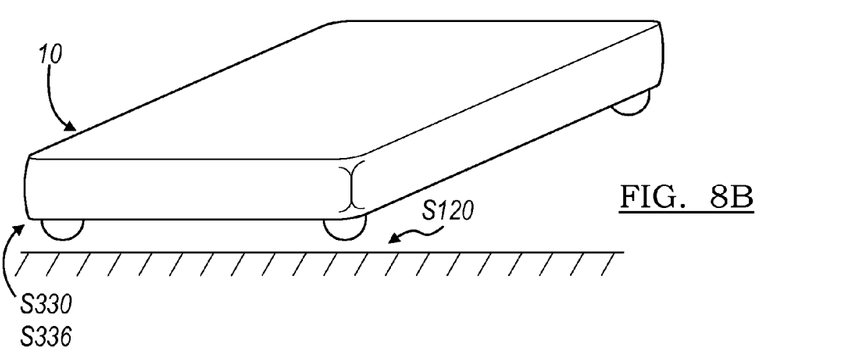

In a second example of the second variation, the second deformable layer 300 may function to put distance between the device 10 and an external surface and/or object, for example, to provide feet or risers that prop the device away from a surface that the device 10 may be placed on, as shown in FIGS. 8a and 8b, to help prevent scratching of the device, in particular, the main face of the device 10 that may include the touch sensitive display. In this example, the second deformable layer 300 may be located on the same face of the device 10 as the first deformable layer because the first deformable layer may be associated with the touch sensitive display. When the device 10 senses that the device is placed on a surface (through accelerometers, proximity sensors such as infrared sensors, or any other suitable sensor), the displacement device 130 may expand a plurality of cavities of the second deformable layer 300 along the face of the device 10 facing the surface to be used as "feet" or risers to prop up the device 10. Alternatively, the second deformable layer 300 of this variation may also be used to put distance between a user and the device 10, for example, to protect a user from the device. In particular, a device may emit radiation and the deformed particular region 313 functions to maintain a particular distance between the device 10 and the user. In another example, if the device 10 is emitting heat, the second deformed particular region 313 may function to put distance between the user and the device 10 to substantially prevent the user from being injured by the heat of the device 10. Alternatively, the user or an application of the device may actuate the employment of the second deformable layer 300. However, any other method may be used to employ the second deformable layer 300 to maintain a distance between the device 10 and a surface, user, and/or any other suitable type of object. In this example, the second deformable layer may be integrated into the first deformable layer, for example, cavities 225 that belong to the first deformable layer may be alternatively be used as "feet" to prop up the device. The second deformable layer may also be located on a face opposite of the main face of the device 10 that may include the touch sensitive display and may be used to stabilize the device 10 as the user applies pressure on the main face and/or touch sensitive display. However, any other suitable arrangement of the second deformable layer 300 may be used.

In a third variation, the second deformable layer 300 may function to change the orientation of the device 10, as shown in FIGS. 9a and 9b. This variation may be thought of as similar the second example of the second variation where "feet" are employed to lift the device 10. In this third variation, the "feet" are used to change the orientation of the device, preferably relative to a surface, for example, when the surface is not flat. The "feet" provided by the second deformable layer and/or the first deformable layer may also be used to level the device to a desired angle. For example, in devices that include image projection functionality, the "feet" may be used align the device as desired by the user. In another example, in the device 10 may include a touch sensitive display that displays a keyboard and the "feet" may be used to orient the device 10 at the desired angle for typing on the touch sensitive display. However, the second deformable layer may provide any other suitable physical feature.

In a fourth variation, the second deformable layer 300 may function to provide a visual aesthetic, as shown in FIG. 10. The second deformable layer 300 may include a plurality of cavities 325 and may function to expand a pattern of cavities 325 to add a certain aesthetic detail to the device 10. The second deformable layer 300 may also function to pulsate the pattern of cavities 325 to add a pulsating aesthetic to the decoration and/or the logo of the company manufacturing the device 10. For example, the company logo of a laptop in standby mode may pulsate. The particular decoration to be exhibited may be selected by the user. Alternatively, a processor may detect the presence of the hand of a user (for example, with a proximity sensor such as an infrared sensor) and employ the decoration. However, any other suitable method to employ the second deformable layer 300 may be used. The decoration may be of any suitable decoration, for example, a shape, the profile of an animal, the user's name, or a message.

The second deformable layer 300 of the user interface 100 may be used to provide any other suitable tactile experience to the user. A light source may also be coupled to the user interface system 100 to augment the experience provided by the device. For example, in the first example of the second deformable layer 300 providing a tactile communication to the user, a set of light sources may be integrated to provide light in phase with the pulsation of the expansion and retraction of the second fluid vessel 327. Alternatively, the fluid 312 of the second deformable layer 300 may function to direct light through the second deformable layer 300 such that the effect of light aimed through the fluid vessel of the second deformable layer 300 may be affected by the arrangement of fluid within the fluid vessel. However, any other suitable experience may be provided to the user of the device 10, for example, a vibration motor may be coupled to the user interface system 100 to provide vibration along with the expansion/retraction of the second fluid vessel 327. The user interface system 100 of the preferred embodiments may alternatively be applied to any other suitable device, for example, the device may be a musical instrument where the deformed particular region 313 of the second deformable layer 300 functions to affect the passage of air or any other suitable type of fluid through the instrument to affect the musical qualities of the instrument. Alternatively, the deformed particular region 313 may come into contact with a string of a stringed instrument and affect the vibration of the string. However, any other suitable application of the user interface system 100 may be used.

The Method of the Preferred Embodiments

As shown in FIGS. 7-9, the method S100 of the preferred embodiments preferably includes providing a first deformable layer Step S200 that defines a first surface and a first fluid vessel that contains a first volume of fluid, providing a second deformable layer Step S300 that defines a second surface and a second fluid vessel that contains a second volume of fluid, selectively deforming at least one of the first and second surfaces Step S110, wherein selectively deforming at least one of the first and second surfaces includes at least one of: manipulating the first volume of fluid to deform a first particular region of the first surface into a tactilely distinguishable formation of a first type Step S210 and manipulating the second volume of fluid to deform a second particular region on the second surface into a tactilely distinguishable formation of a second type that substantially changes the shape of the device Step S310. As described above, the step of manipulating the first volume of fluid preferably includes configuring the first type of tactilely distinguishable formation to receive a user input Step S120. However, the first type of tactilely distinguishable formation may function to provide any other suitable function to the device.

In a first variation of the step of manipulating the second volume of fluid, the second volume of fluid is manipulated to configure the second type of tactilely distinguishable formation to provide information to the user Step S320. In a first example, the information may include alerting the user regarding the operation of the device Step S322, for example, in the variation of the device 10 that receives messages, such as a mobile phone, the second volume of fluid may be manipulated to alert the user on a received message. In a second example of the first variation, the information may include indicating the location of a particular feature of the device Step S324, for example, the location of the speaker on a device 10 that is a mobile phone. However, the second type of tactilely distinguishable formation may provide any other suitable type of information.

In a second variation of the step of manipulating the second volume of fluid, the second volume of fluid is manipulated to configure the second type of tactilely distinguishable formation to provide protection for the device Step S330, as shown in FIGS. 7 and 8. In a first example, the second type of tactilely distinguishable formation is configured to provide a bumper for the device, as shown in FIG. 7. In this first example, the method S100 of the preferred embodiments preferably includes the step of detecting the acceleration of the device S111 and providing a bumper for the device when the acceleration of the device is detected to be above a threshold that may indicate that the device is falling Step S332. This variation may also include the step of predicting the face of the device closest to the potential impact Step S112 and providing a bumper for the face of the predicted face of impact Step S334. In a second example of the second variation, the second type of tactilely distinguishable formation is configured to provide "feet" or risers for the device, as shown in FIG. 8. In this example, the method S100 of the preferred embodiments preferably includes the step of detecting the proximity of a face of the device to an external surface Step S120 and providing a bumper for surface detected to be in substantial proximity to an external surface Step S336. However, any other suitable protection may be provided to the device by the second type of tactilely distinguishable formation.

In a third variation of the step of manipulating the second volume of fluid, the second volume of fluid is manipulated to configure the second type of tactilely distinguishable formation to change the orientation of the device Step S340, as shown in FIG. 9. In this variation, the method S100 of the preferred embodiments preferably includes the step of detecting the orientation of the device Step S130, for example, the angle of the device relative to the ground, a surface, or any other suitable reference. In the example as shown in FIG. 9, the second type of tactilely distinguishable formation of the third variation may be arranged similar to the "feet' of the second variation where a portion is located on one side of a face of the device and another portion is located on another side of a face of the device, preferably opposite of the first portion and both portions preferably are in contact with an external surface. The external surface may be an irregular surface, such as those seen on rocks, or may be a substantially planar surface, such as a table, but may alternatively be any other suitable type of surface. The fluid is preferably manipulated to deform the portions of the tactilely distinguishable formation in substantially different degrees to substantially affect the orientation of the device, for example, one portion will be deformed to a higher degree than another to raise the corresponding side of the face and change the orientation of the device. However, any other suitable arrangement of the second tactilely distinguishable formation of the third variation may be used.

In a fourth variation of the step of manipulating the second volume of fluid, the second volume of fluid is manipulated to configure the second type of tactilely distinguishable formation to provide an aesthetic feature to the device, as shown in FIG. 10. This variation of the method S100 may include actuating the aesthetic feature at a desired time. In a first example, the aesthetic feature may be activated at a preprogrammed time, for example, every five minutes, whenever the device is turned on and/or off, when a function of the device is turned on and/or off, or any other suitable time. The preprogrammed time may be preset by a manufacturer, but may alternatively be set by the user. Alternatively, the aesthetic feature may be activated on a case by case basis, for example, when the user selects to activate the feature or when an event occurs. However, any other suitable activation of the aesthetic feature may be used.

A channel 138 couples a first group of cavities 325 and a second group of cavities 325 to the displacement device 130. The first and second groups of cavities 325 are preferably not directly connected to each other. The channel 138 preferably forms a T-junction between the displacement device 130 and the two groups of cavities 325, and the channel preferably includes a valve 132 at the T-junction to direct fluid displaced by the displacement device 130 to one or both of the groups of cavities 325. However, the channel 138 may be of any other suitable orientation. The valve 132 is preferably of the type described above in the second preferred embodiment. In a variation where one cavity 325 may belong to more than one group of cavities 325, for example, as shown in FIG. 7 where a first group of cavities 325 that correlate to a landscape QWERTY keyboard and a second group of cavities 325 that correlate to a portrait QWERTY cavity 325 group share cavities 325. The shared cavities 325 may be thought of as a third group of cavities 325 that cooperates with the first group of cavities 325 to correlate to a landscape QWERTY keyboard and cooperates with the second group of cavities 325 to correlate to a portrait QWERTY keyboard. In this variation, each of the shared cavities 325 may be coupled to more than one channel 138, as shown in FIGS. 8*a* and 8*b*. This allows expansion of each shared cavity 325 when any of the displacement devices 130 pertaining to each of the groups to which the cavity 325 belongs is activated. To regulate the expansion of the cavity 325, the cavity 325 may include a valve of a type described above for valve 132 that prevents fluid from a first channel 238 belonging to a first group to flow through the cavity 325 to a second channel 338 belonging to a second group. The valve may also be used to prevent fluid from more than one channel 138 to expand the cavity 325, which may potentially cause the over-expansion of the cavity 325. However, any other suitable arrangement of a cavity 325 that may belong to more than one group may be used.

As a person skilled in the art will recognize from the previous detailed description and from the figures and claims, modifications and changes can be made to the preferred embodiments of the invention without departing from the scope of this invention defined in the following claims.

We claim:

1. A user interface system for a device comprising a touch-sensitive display and a discrete input region remote from the display, the user interface system comprising:
   a first deformable layer coupled to the touch-sensitive display and comprising a first sheet that defines a first particular region, an adjacent region, and a first fluid vessel underneath the first, particular region, the first deformable region providing a linear response when input is received at the first deformable region to inwardly deform the first deformable region;
   a first volume of fluid supported within the first fluid vessel;
   a second deformable layer arranged over the discrete input region remote from the display, distinct from the first deformable layer, and comprising a second sheet that defines a second particular region, a second adjacent region, and a second fluid vessel arranged underneath the second particular region and fluidly coupled to the first fluid vessel, the second deformable layer is formed from a material which has a stiffness that differs from a stiffness of a material from which the first deformable layer is formed;
   a second volume of fluid supported within the second fluid vessel;
   a sensor coupled to a second deformable region proximal the discrete input region and remote from the display, the sensor outputting a signal in response to an input at the second deformable region; and
   a displacement device fluidly coupled to the first fluid vessel and to the second fluid vessel, selectively manipulating the first volume of fluid to expand the first particular region above the adjacent region, and selectively manipulating the second volume of fluid to expand the second particular region above the second adjacent region independently of the first particular region.

2. The user interface system of claim 1, further comprising a processor coupled to the displacement device, the processor detecting an external object proximal the first deformable layer and actuating the displacement device to displace fluid into the first fluid vessel to selectively expand the first particular region.

3. The user interface system of claim 2, wherein the processor detects an adjacent external face proximal the first deformable layer and actuates the displacement device, thereby selectively manipulating the second volume of fluid to deform the second particular region.

4. The user interface system of claim 1, wherein the displacement device selectively and independently manipulates the first volume of fluid to pulsate the surface of the deformed first particular region and the second volume of fluid to pulsate the surface of the deformed second particular region.

5. The user interface system of claim 1, wherein the second deformable layer comprises a tactile location indicator; wherein the second deformable layer is arranged over a volume button of the device; and wherein the second particular region defines a tactilely-distinguishable indicator corresponding to the volume button when expanded by the displacement device.

6. The user interface system of claim 1, wherein the first particular region deforms inwardly; further comprising a support surface arranged proximal the second particular region, the support surface resisting inward deformation of the second particular region into the fluid vessel past flush with the second adjacent region.

7. A user interface system for a device comprising, a touch sensitive display comprising:
   a layer coupled to the device and defining a dynamic surface, the layer defining a first set of particular regions formed from a first material arranged coincident the touch sensitive display of the device and a second set of particular regions formed from a second material arranged remote the touch sensitive display of the device, the first and second materials differing in stiffness:
   a substrate coupled to the layer and defining a first group of cavities and a second group of cavities, the first group of cavities substantially aligned with the first set of particular regions and the second group of cavities substantially aligned with the second set of particular regions;
   a first volume of fluid supported by a first channel fluidly coupled to each cavity in the first group of cavities, the first set of particular regions defining a portrait keyboard layout in an expanded setting and a planar surface coincident the surface in a planar setting;
   a second volume of fluid supported by a second channel fluidly coupled to each cavity of the second group of cavities, the second set of particular regions defining a landscape keyboard layout in the tactilely distinguishable formation and the planar surface coincident the surface in a planar setting;
   a sensor coupled to deformable region proximal a discrete input region and remote from the display, the sensor outputting a signal in response to an input at the deformable region, the deformable region providing a linear response when input is received at the deformable region to inwardly deform the deformable region; and
   a displacement device fluidly coupled to the first fluid channel and to the second fluid channel, the displacement device selectively and independently manipulating the first volume of fluid to deform the first set of particular regions, and the displacement device manipulating the second volume of fluid with the first volume of fluid to deform the second set of particular regions.

8. The user interface system of claim 7, wherein the first volume of fluid deforms the first set of particular regions defining a portrait QWERTY keyboard layout, and where the second volume of fluid deforms the second set of particular regions defining a landscape QWERTY keyboard layout.

9. The user interface system of claim 7, wherein the layer comprises a first deformable layer and a second deformable layer, the first deformable layer arranged over the first group of cavities and the second deformable layer arranged over the second group of cavities.

10. The user interface system of claim 7, wherein the displacement device pulsates the second volume of fluid into and out of the second group of cavities, pulsating the layer.

* * * * *